United States Patent

[11] 3,533,432

[72] Inventor William D. Kirby
 2121 Hamilton Court, Richland,
 Washington 98160
[21] Appl. No. 759,039
[22] Filed Sept. 11, 1968
[45] Patented Oct. 13, 1970

[54] SELECTOR VALVE FOR IRRIGATION SYSTEM
 3 Claims, 7 Drawing Figs.
[52] U.S. Cl. .................................................. 137/119,
 137/627, 239/66
[51] Int. Cl. .................................................. F16k 21/00,
 31/43; B05b 9/00
[50] Field of Search .................................................. 137/119,
 625.11, 624.18, 627; 239/66

[56] References Cited
UNITED STATES PATENTS
2,880,757 4/1959 Campbell ..................... 137/627

3,459,208 8/1969 Clyde ........................... 239/66

Primary Examiner—William F. O'Dea
Assistant Examiner—Howard M. Cohn
Attorney—Keith S. Bergman ABSTRACT: A multiport valve, operated by flow interruption, providing a central chamber with plural output orifices concentrically positioned therein and plural valves associated with each output orifice, normally closed but openable by vertical extension with the central chamber, and a central input orifice having a plunger carrying selector mechanism in its upper portion to open one output orifice upon activation, return to null position upon interruption of flow through the input and by this return move radially to appropriate position to open the next adjacent output valve upon further operation. The valve is particularly adapted to operate, in conjunction with a flow interruption device, an irrigation system having plural outlet lines to supply water for predetermined intervals consecutively to each line.

Patented Oct. 13, 1970

William D. Kirby, INVENTOR.

BY

Patented Oct. 13, 1970
3,533,432
Sheet 2 of 3
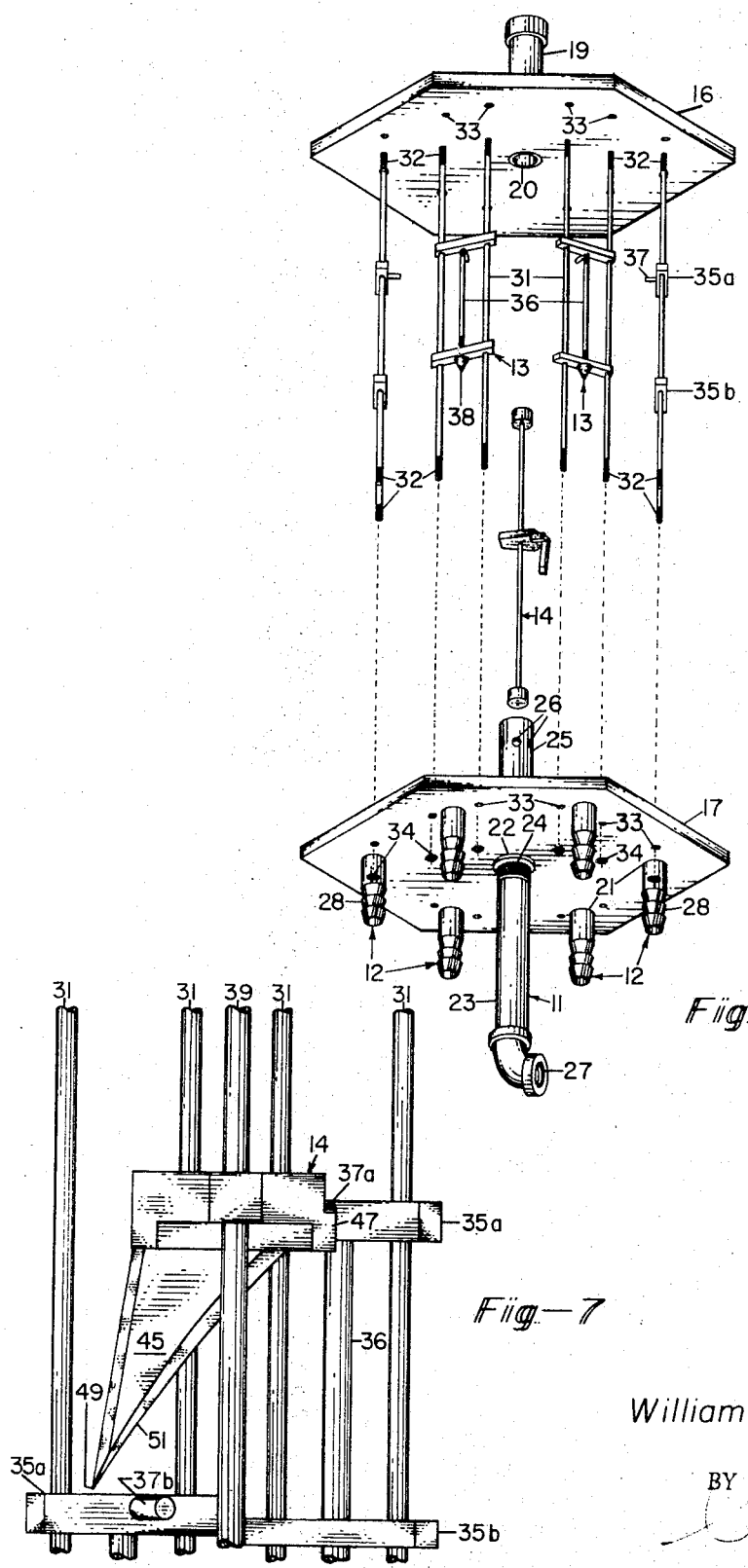
Fig.-3
Fig.-7
William D. Kirby, INVENTOR.
BY 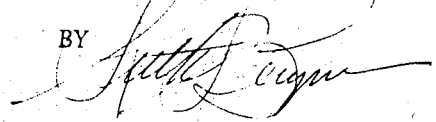

William D. Kirby, INVENTOR.

BY

SELECTOR VALVE FOR IRRIGATION SYSTEM

BACKGROUND OF INVENTION

1. Field of Invention

This invention relates generally to the field of multiport selector valves and more particularly to such a valve having a central plunger operated by the input flow to open one of a plurality of concentric output orifices upon activation and move radially on cessation of flow to a null position from whence the next adjacent output orifice may be activated upon renewed flow.

2. Description of Prior Art

With the advent of plastic pipe, sprinkler systems have become less costly of acquisition and installation and by reason thereof have become more common. With this increase in sprinkler systems there has come to be an increased desire for automatically operated sprinkler systems and many varieties of automatic and semiautomatic systems have come to be known to provide irrigation in predetermined areas at predetermined times. Many of the known automatic systems have operated electrically, mechanically or by some electromechanical combination of control components. These systems in general have been reasonably complex and because of their complexity quite unreliable in operation. The electrical systems also have the added hazard of electric shock enhanced by the close association with a quite good ground.

The instant invention is distinguished from this prior art in that it provides a valving structure which is hydraulically operated by the change in flow of water presented thereto to open only one of a plurality of ports successively in cyclic fashion. The valve has no timing mechanism but rather relies upon some external device to periodically interrupt the flow of water. There are no electrical operations and the particular mechanics of the valve are extremely simple, giving rise to a nearly absolutely dependable operation and an extremely economic manufacture.

Aside from the hydraulic activation, the invention is distinguished from other mechanical multiport selector valves in the particular details of structure. It has no diaphragms as have many known valves operating upon a pressure differential and provides plural orifices exiting from a common input chamber as opposed to many shutoff valves not providing such a common chamber or plural outputs. It is distinguished from the gate-type shutoff valves and those having plural gate-type shutoff mechanisms in that the operating plunger of my valve is concentrically located and has both a reciprocating and rotary action to service the several ports thereabout.

SUMMARY OF INVENTION

The instant invention provides a valve with plural concentrically positioned exit ports having individual valving structures adapted to communicate with a central extensibly and radially moveable plunger to open and close individual exit ports successively upon interruption of fluid supply through the input port.

This function is accomplished by the provision of a valve chamber with plural output ports concentrically arranged in an array about an input port. Each output port has a separate valving structure normally biased to a closed position but openable, by inward vertical extension within the valve chamber thereabout. Each of these output valving structures is carried upon guide rods extending through the valve chamber to provide means of holding the chamber together.

The input pipe extends for some distance within the valve chamber; it slidably carries within this extension a plunger and connecting activation rod for extension within the chamber upon presentment of pressurized fluid through the input pipe. The plunger is mechanically biased to a normally nonextended position. In its upper part this plunger carries activating mechanism adapted to mechanically communicate with one of the plural output valving mechanisms to cause the output valve to raise with the plunger in its inward extension to open the valved output port. Upon return of the plunger to its nonextended position, the operating mechanism is released from the valve structure it operated in the immediate past and radially moved, during the lineal motion to its biased position by cessation of pressurized fluid to the plunger, to the next successive output valve structure to operate this structure upon the next plunger motion.

To provide such a valving mechanism it is:

A principal object of my invention to create a multiport valve that will operate to present flow to one of a plurality of output ports and upon cessation of flow thereto will move to present the future flow to the next successive output orifice and continue in similar cyclic fashion.

To provide a structure of the nature aforesaid that is activated hydraulically and has a minimum of mechanical operations and structures to provide a valve of an extremely reliable nature.

A further object of my invention to provide a valving structure of the nature aforesaid that is not dependent upon air pressure or differential hydraulic pressures for operation.

A still further object of my invention to provide such a valve structure that is of new and novel design, of rugged and durable nature, of simple and economic manufacture and one that is otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangement with only one preferred and practical embodiment being illustrated in the accompanying drawings, as required.

BRIEF DESCRIPTION OF DRAWINGS

In the accompanying drawings wherein like numbers refer to similar parts throughout:

FIG. 3 is an exploded isometric view, with valve cover removed, of the internal structure of my valve;

FIG. 7 is a detailed isometric view showing the central plunger returning to a closed position, closing one output valve and contacting the next adjacent valve to open it in the next motion.

DESCRIPTION OF PREFERRED EMBODIMENT

Figure 2:
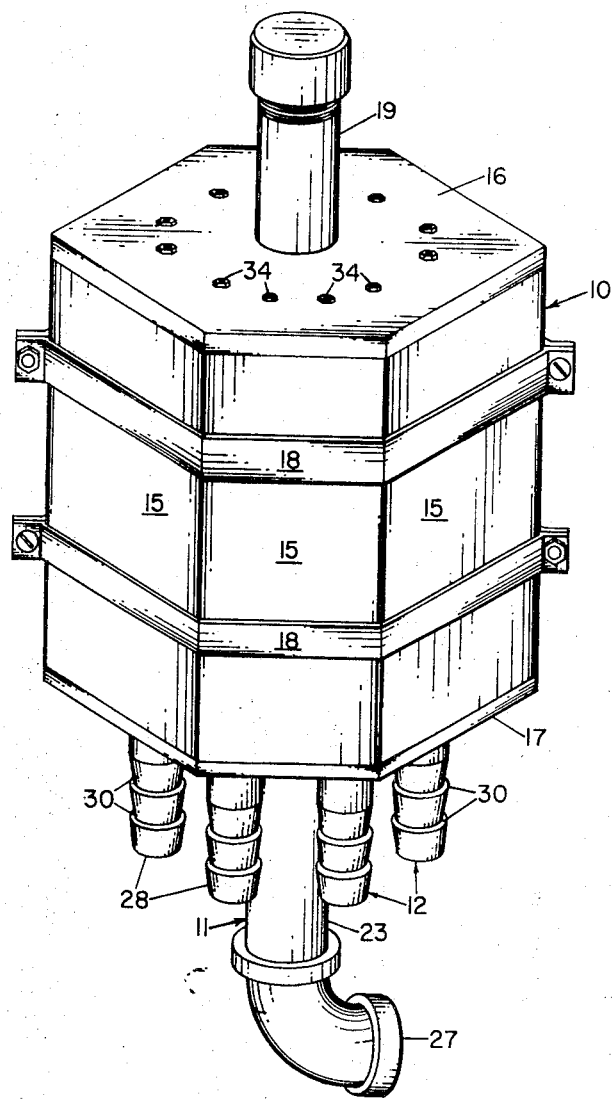
FIG. 2 is an isometric view of one form of my invention illustrating its surface parts, their configuration and relationship.

Referring now to the drawings in more detail and particularly to those of FIGS. 2 and 3, it will there be seen that my invention generally comprises valve body 10, with associated input plunger structure 14, and having input port 11 and plural exit ports 12, each with plural exit valve structures 13.

Valve body 10, of hexagonal shape in the form illustrated, is formed with plural side elements 15 maintained between the peripheral edges of top 16 and bottom 17 to form an enclosed valve chamber. Peripheral bands 18 about the external surfaces of the sides add structural rigidity. The top and bottom are preferably held in position against the end portions of the sides by the guide rods of the exit valve structures as hereinafter more specifically described. Upper guide 19 allows extension of the upper portion of the input plunger structure above top 16 and provides channel 20, communicating with the internal chamber of the valve, to maintain the top portion of the input plunger structure in appropriate alignment. Preferably this upper guide is a pipe element structurally carried by top 16 and covered by a pipe cap.

Bottom 17 is provided with orifices 21 to receive plural output ports 12 and orifice 22 to receive central input port 11.

Input port 11 has external input pipe 23 communicating with bottom 17 by fixture 24 and extending some distance within the valve chamber by internal input pipe 25. Plural orifices 26 extend through internal input pipe 25 at a spaced distance below its uppermost extension. The lowermost portion of external input pipe 23 is provided with pipe fixture 27 to aid in plumbing the valve to an ordinary piped supply of pressurized water.

Plural exit ports 12, in this instance nipple-like structures 28, communicate through bottom 17 of the valve body to terminate along the upper or internal surface of bottom 17 in valve seats 29. The nipples are provided with annular protuberances 30 in their depending portions to seat ordinary plastic pipe of commerce, maintained thereon by external clamps (not shown). Preferably the nipples are structurally joined to bottom 17 by gluing with one of the plastic-type adhesives but may be joined by some similar watertight joinder.

The spacing of exit ports 12 is somewhat critical in my invention. The ports must be at a uniform radial distance from the input port so that their valving structures may communicate with the upper part of plunger structure 14, and they must be arcuately spaced with reference to each other to allow appropriate functioning as hereinafter specified.

Exit valve structures are shown best in the illustration of FIG. 3. It is seen that they include paired spaced guide rods 31 having threaded end portions 32 adapted to fit within plural opposed cooperating holes 33 in top 16 and bottom 17 of valve body 10. Taps 34 threadedly engage end portions 32 of these rods externally of top 16 and bottom 17, when appropriately placed, to hold the rods in position and aid in maintaining the valve body in releasable assemblage.

Mounted for sliding motion on the guide rods are paired cross arms 35 maintained in spaced position by medial vertical supports 36. The upper cross arm 35a carries inwardly projecting exit valve dog 37 and the medial part of the lower surface of lower cross arm 35b carries conical valve element 38 adapted to seat within seat structure 29 of exit port 12 to prevent flow through the port when the valve is in closed position.

The frictional engagement between cross arms 35 and guide rods 31 and the mass of the movable parts of the valve structures are such as to bias the valve structure to a normally closed position by reason of gravity. If this biasing be not sufficient, or if it be desired to operate the valve in some position other than that illustrated, a separate mechanical biasing means such as a compression spring (not shown) might be used to bias the exit valve structures to their normally closed position.

To accomplish the motions specified with appropriate physical relationships, I prefer to use a metallic guide rod 31 and a plastic cross arm 35.

Input plunger structure 14 includes elongate plunger rod 39 carrying lower plunger 40 in its lower end and upper plunger 41 in the upper end. The dimensioning of the plungers is such that the lower plunger will slidably fit for hydraulic motion within the internal chamber 42 of internal input pipe 25 and the upper plunger will fit for sliding motion within channel 20 of upper guide 19. Channels 20, 42 serving as guides for the vertical motion of the plunger rod are so positioned that the line of motion therethrough constitutes the axis of concentricity of the exit valve structures, so that plunger rod 39 is substantially parallel with guide rods 31.

The upper medial part of plunger rod 39 structurally carries the radially extending moving dog block 43. The radially outermost edge 44 of this block in its forward part pivotably mounts moving dog 45 by means of screw 46 extending therethrough and into the moving dog block. In the rearward part of the radial edge of block 43 is exit valve dog block 47 having an upper surface with cylindrical indentation 48 adapted to receive exit valve 37.

Figure 4:
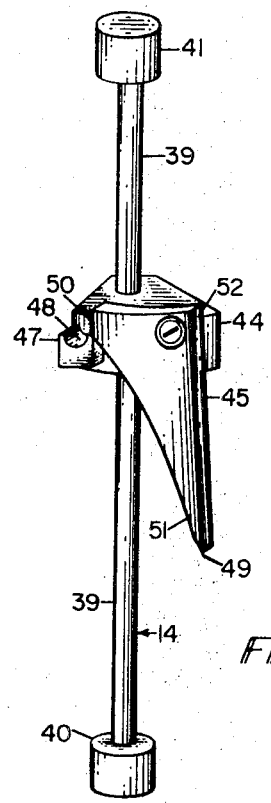
FIG. 4 is a detailed isometric view of the central plunger assembly.
Figure 5:
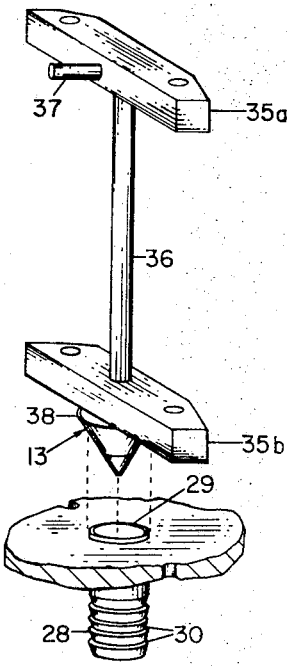
FIG. 5 is a detailed isometric view of the output valving structure.
Figure 6:
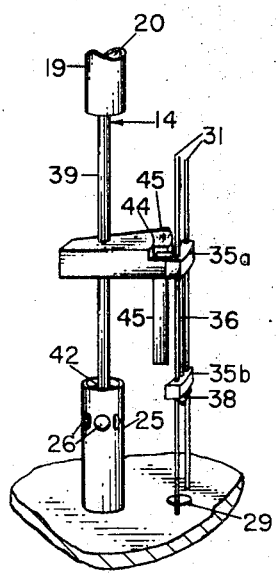
FIG. 6 is a detailed isometric view of the central plunger holding an output valve structure in open position.

The configuration and mounting of moving dog 45 is critical to my invention. This member should be of a shape substantially as illustrated in FIG. 4, so that when it is acted upon by gravity as there shown, lower point 49 will be somewhat forward of a vertical line through pivot screw 46. It is stopped in this position from further pivotable motion by the forward shoulder of exit valve dog block 47 contacting the lower surface of the lateralmost portion 50 of the dog.

The operation of the structure can be most clearly seen in the illustration of FIG. 7. When input plunger structure 14 raises, one output valve will be raised by reason of its dog 37 being in mechanical communication with exit valve dog block 47, and in this position moving dog 45 will be above the valve dog with its lowermost portion 49 forwardly of the dog so that when the input plunger structure returns to it normally biased downward position (upon cessation of flow of fluid through the input), the laterally facing curved surface 51 of moving dog 45 will be forwardly of exit valve dog 37b of the next input valve and as the input plunger structure moves downwardly it will rotate an angular amount to come into operative contact with the next output valve upon reactivation. As the input plunger structure moves completely downward, moving dog 45 will pivot sufficiently to allow exit valve dog 37b to pass between lateralmost portion 50 of moving dog 45 and the forward surface of exit valve block 47 so that exit valve dog 37b of the next exit port will be in position for operation upon the next upward motion of the plunger structure.

The dimensioning and configuration of the input plunger structure must be appropriate to accomplish the aforesaid action. Particularly, to avoid mechanical difficulty, the radial distance between the center of the cylindrical indentation 48 of exit valve dog block 47 and the forwardmost surface 52 of moving dog 45 must be substantially the same as the circular distance between two adjacent exit valve dogs 37 of two adjacent exit ports.

Having thusly described the structure of my invention, its operation may now be understood.

Figure 1:
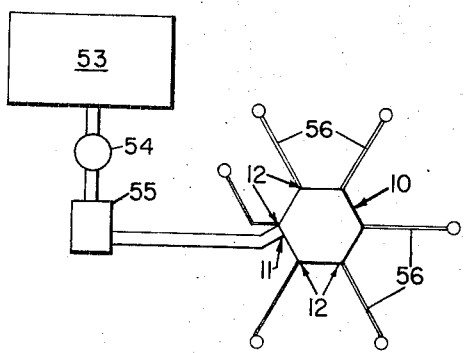
FIG. 1 is a semidiagrammatic illustration of a typical irrigation system showing its various elements and my invention in relation thereto.

The system in which such a valve structure operates is shown best in the illustration of FIG. 1. Some water source 53 supplies pressurized water through shutoff valve 54 to the irrigation system extending therefrom. This water is supplied through time operated shutoff device 55 which allows flow of water at predetermined periods. Such devices are well known in the hydraulic arts and readily available in commerce. From the timer valve the water system communicates by appropriate piping to the input orifice 11 of my valve structure 10. Plural lateral distribution lines 56 communicate from plural exit ports 12 of my valve structure to the several areas to be operated upon.

As operation commences my valve is in a null condition with exit valve dog of one valve resting in cylindrical indentation 48 of exit valve dog block 47 of the input plunger structure in a downwardmost position with all of the plural exit valve structures 13 in their normally biased closed position. As water is presented to the valve, its pressure causes input plunger structure 14 to rise with lower plunger 40 above plural orifices 26 of internal input pipe 25, and as this happens the particular exit valve structure 13a communicating therewith moves upwardly to open exit port 12a. Water then flows into the internal chamber within the valve body and exits through open exit port 12a. So long as water flow continues uninterrupted, this condition continues.

As water flow is interrupted by the shutoff device 55, the pressure maintaining input plunger structure 14 upwardly is relieved and by reason of the bias on the structure, it returns to its normal closed or downward position. When the structure was in its upwardmost condition it will be remembered that the lowermost part 49 of moving dog 45 was forwardly in a vertical plane of the radially forwardmost edge of exit dog 37b of the next forwardly adjacent exit valve structure 13b. When the input plunger structure moves downwardly then, lower rearwardly facing curved edge 51 of moving dog 45 will communicate with exit valve dog 37b and by reason of this communication, since input plunger structure 14 is free to pivot, it will pivot in a forward direction toward exit port 12b; in so doing exit valve dog 37b will move along under surface 52 of moving dog 45 until it passes between this dog 45 and exit valve dog block 47, from whence it will come to its lowestmost position, and exit valve dog 37b will rest in or immediately vertically above cylindrical indentation 48 of exit valve dog block 47.

In this condition then, when water be reapplied it will recycle in the same fashion as aforesaid, only with water exiting through exit port 12b. Then on further flow cessation the mechanism will again move radially forward so that the next adjacent port will open after the next flow cessation. In this fashion then, each exit port will be opened in order, cyclically, so long as the water flow continues to be interrupted.

It is to be noted from the foregoing description that various of the operating parts are biased to a particular null position and that in the example illustrated this bias is accomplished by gravitational means. Obviously, other means of so biasing the various elements might be provided, such as extension or compression springs or the like and these modifications are clearly within the ambient of the present invention. It is similarly obvious that the structural shape and configuration of the various parts might be changed and that the vertical orientation of the valve and its parts might be changed or varied if mechanical bias were provided for the various parts.

It is also to be noted from the foregoing description that manual means of moving the central plunger structure might be added to my invention to allow selection of the first output port to become operative, if this feature be desirable. Similarly a manually operable valve might be used to move the valve structure to a desired initial position by rapid sequencing of the valve.

It is further to be noted that when the valve chamber is full of fluid, this fluid will create some pressure upon the closed exit port valves to aid in maintaining them in closed position in their seats.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

I claim:

1. A multiport valve structure of the nature aforesaid comprising, in combination:
   a body enclosing a valve chamber;
   an input port communicating with the valve chamber;
   plural exit ports concentrically and symmetrically spaced about the input port;
   exit valves operatively associated with each exit port and biased to a normally closed position between each exit port and the valve chamber;
   an input plunger, slidably carried within the input port, biased to an outward position but extendable within the valve chamber in response to fluid flow through the input port; and
   mechanical means communicating between the input plunger and exit valves to open one exit valve upon flow of fluid into the valve chamber and move to a position to potentially open the next adjacent exit valve upon return of the input plunger to its normally biased position upon cessation of fluid through the input port.

2. The invention of claim 1 wherein the mechanical means communicating between input plunger and exit valve structures is further characterized by:
   an exit valve dog carried by each exit valve structure; and
   a mounting dog block, carried by the input plunger, having an exit valve dog block to communicate with an exit valve dog to open the valve upon inward extension of the input plunger and a pivotably mounted moving dog to radially move the input plunger upon return to its normally biased position.

3. A multiport selector valve of the nature aforesaid adapted to switch future flow therethrough from one of a plurality of exit ports to an adjacent exit port upon interruption of flow thereto, comprising, in combination:
   a body structure enclosing a valve chamber;
   an input port in the lower medial portion of the body structure having an input orifice extending upwardly within the valve chamber and a plurality of exit orifices at a spaced distance below the uppermost extension thereof;
   plural exit ports concentrically spaced about the input port, communicating through the bottom of the valve body and terminating in their upward extension in valve seats;
   plural exit valve structures associated with each exit port including paired spaced guide rods having slidably mounted thereon cross elements carrying conical valves to communicate with the seats of the exit ports therebelow and exit valve dogs radially inwardly extending therefrom; and
   an input plunger structure including an elongate rod having a lower plunger slidably engaged within the input orifice for vertical motion therein and a mounting dog block in the upper portion having a pivotably mounted valve dog in the forward portion thereof, to contact the next forward exit valve dog upon closing to rotate the input plunger structure to communicate with the next exit valve dog, and an exit valve dog block in the rearward portion of the mounting dog block communicating with the exit valve dog of a valve structure to vertically move that structure to open the valve upon motion of the central plunger structure from its normally biased outward position.